(12) United States Patent
Bottomley et al.

(10) Patent No.: US 8,161,470 B2
(45) Date of Patent: Apr. 17, 2012

(54) SYSTEMS, METHODS, AND COMPUTER PRODUCTS FOR AUTOMATED INJECTION OF JAVA BYTECODE INSTRUCTIONS FOR JAVA LOAD TIME OPTIMIZATION VIA RUNTIME CHECKING WITH UPCASTS

(75) Inventors: T. Mark W. Bottomley, Orleans (CA);
Nicholas J. Doyle, Halifax (CA);
Aleksandr V. Kennberg, Waterloo (CA);
Orlando E. Marquez, Toronto (CA);
Amey A. Shirodkar, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 1207 days.

(21) Appl. No.: 11/848,337

(22) Filed: Aug. 31, 2007

(65) Prior Publication Data

US 2009/0064114 A1 Mar. 5, 2009

(51) Int. Cl.
*G06F 9/45* (2006.01)
(52) U.S. Cl. .......................... 717/148; 717/154; 717/159
(58) Field of Classification Search ........................ None
See application file for complete search history.

(56) References Cited

U.S. PATENT DOCUMENTS

| | | | |
|---|---|---|---|
| 6,131,187 A | 10/2000 | Chow et al. | |
| 6,314,558 B1 | 11/2001 | Angel et al. | |
| 6,363,522 B1 * | 3/2002 | Click et al. | 717/160 |
| 6,578,191 B1 * | 6/2003 | Boehme et al. | 717/107 |
| 6,662,359 B1 | 12/2003 | Berry et al. | |
| 6,763,397 B1 * | 7/2004 | Bracha et al. | 719/332 |
| 7,055,146 B1 | 5/2006 | Durr et al. | |
| 7,197,511 B2 * | 3/2007 | Bracha et al. | 717/166 |
| 7,293,267 B1 * | 11/2007 | Fresko | 717/166 |
| 7,426,720 B1 * | 9/2008 | Fresko | 717/140 |
| 2003/0121031 A1 * | 6/2003 | Fraenkel et al. | 717/166 |
| 2004/0117787 A1 * | 6/2004 | Sowa et al. | 717/174 |
| 2008/0127141 A1 * | 5/2008 | Fulton | 717/148 |

OTHER PUBLICATIONS

IBM, "Method and Apparatus for Dynamic Inclusion of Profiling Functionality's in Java Classes", IP.com Apr. 2, 2004.

* cited by examiner

*Primary Examiner* — Li Zhen
*Assistant Examiner* — Evral Bodden
(74) *Attorney, Agent, or Firm* — Cantor Colburn LLP; Libby Toub

(57) ABSTRACT

Automated injection of Java bytecode instructions for Java load time optimization via runtime checking with upcasts. Exemplary embodiments include a method including generating a stack for each of a plurality of bytecodes, generating a subclass configured to keep a history of instructions that have modified the stack, statically scanning a plurality of Java classes associated with the plurality of bytecodes to locate class file configurations and bytecode patterns that cause loading of additional classes to complete a verification of each of the classes in the plurality of Java classes, rewriting the bytecodes to delay the loading of the additional classes until required at a runtime, recording modifications that have been made to the stack by the instructions, and applying the modifications to each of the bytecodes in the plurality of bytecodes.

2 Claims, 2 Drawing Sheets

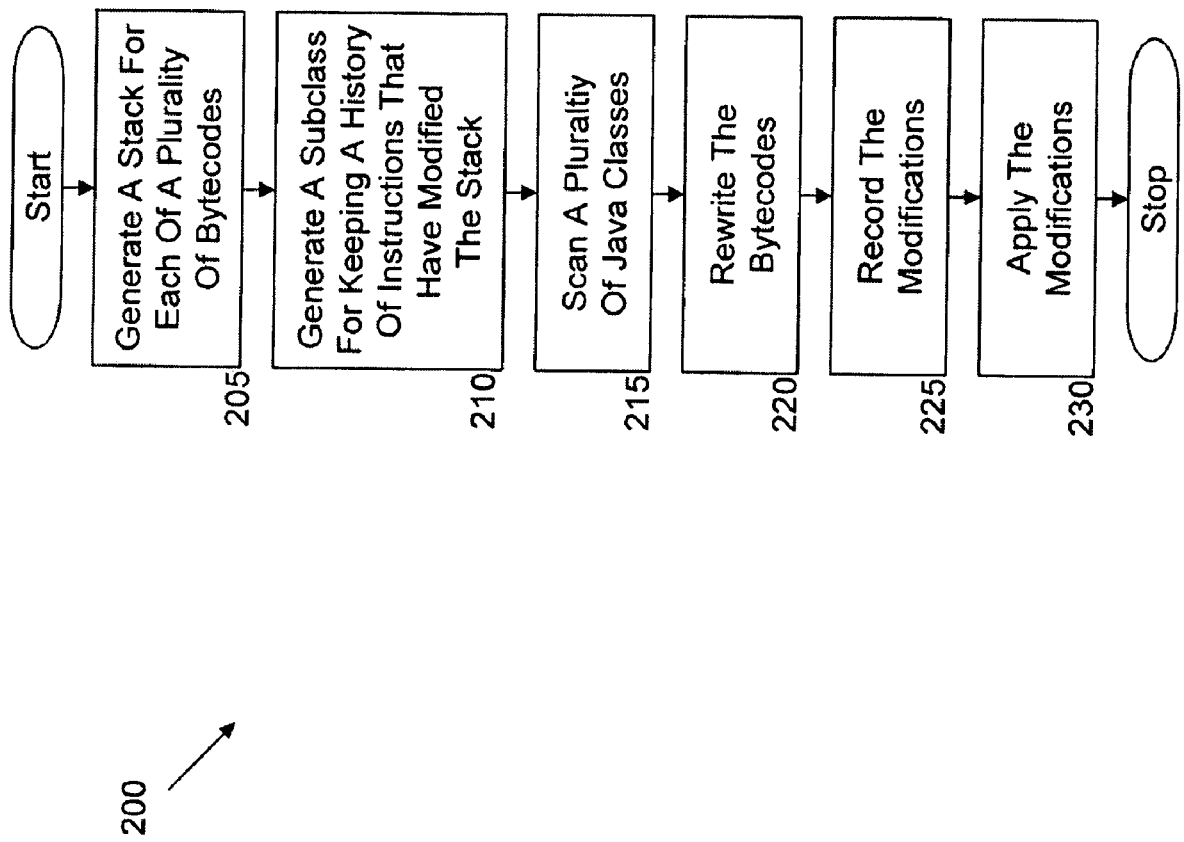

US 8,161,470 B2

SYSTEMS, METHODS, AND COMPUTER PRODUCTS FOR AUTOMATED INJECTION OF JAVA BYTECODE INSTRUCTIONS FOR JAVA LOAD TIME OPTIMIZATION VIA RUNTIME CHECKING WITH UPCASTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to Java programming, and particularly to automated injection of Java bytecode instructions for Java load time optimization via runtime checking with upcasts.

2. Description of Background

Java virtual machine performs verification of all loaded classes, except those from the bootclasspath. Verification requires every exception being thrown and caught be checked to be a subclass of java.lang.Throwable. It also requires checking of all non-trivial referenced types (i.e. not java.lang.Object or null) that do not match instruction parameters, method signatures or return types (e.g. assume that class Dog is a subclass of class Mammal, then saving an instance of Dog into a field of type Mammal in some class X would require loading class Dog and all it's superclasses to confirm it is indeed a subclass or Mammal). The other location for mismatch checking is at bytecode execution merge points where the stack or local variable entries contain different class types. The verifier merges these types to a common superclass type by loading each referenced class and all it's subclasses to determine the common type to propagate in the stack and local variable state. These additional class loads negatively impacts start-up performance of Java applications, increasing their memory footprint and causing extra file I/O access.

Some current solutions focus on patterns in the source code rather than bytecode. This approach changes the programmer's code, which can be visually unappealing. In general, this approach does not promote writing clean code and often breaks coding standards.

Therefore, there exists a need for deferring verification that focuses on bytecode rather than source code.

SUMMARY OF THE INVENTION

Exemplary embodiments include a method for automated injection of Java bytecode instructions for Java load time optimization via runtime checking with upcasts, the method including generating a stack and local variable state for each of a plurality of bytecodes, generating a subclass configured to keep a history of instructions that have modified the stack and local variable state, statically scanning a plurality of Java classes associated with the plurality of bytecodes to locate class file configurations and bytecode patterns that cause loading of additional classes to complete a verification of each of the classes in the plurality of Java classes, the bytecode patterns including a Java exception throw, a Java exception catch, an upcast of method arguments, an upcast of method returns and an upcast of field access, rewriting the bytecodes to delay the loading of the additional classes until required at a runtime, recording modifications that have been made to the stack and local variable state by the instructions, and applying the modifications to each of the bytecodes in the plurality of bytecodes.

Further exemplary embodiments include a Java virtual machine system configured to automatically inject Java bytecode instructions for Java load time optimization via runtime checking with upcasts, the system including a computer processor coupled to a memory having instructions for generating a stack for each of a plurality of bytecodes, generating a subclass configured to keep a history of instructions that have modified the stack and local variable state, statically scanning a plurality of Java classes associated with the plurality of bytecodes to locate class file configurations and bytecode patterns that cause loading of additional classes to complete a verification of each of the classes in the plurality of Java classes, the bytecode patterns including a Java exception throw, a Java exception catch, an upcast of method arguments, an upcast of method returns and an upcast of field access, rewriting the bytecodes to delay the loading of the additional classes until required at a runtime, recording modifications that have been made to the stack by the instructions and applying the modifications to each of the bytecodes in the plurality of bytecodes.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for deferring verification focusing on bytecode which automatically injects Java bytecode instructions for Java load time optimization via runtime checking with upcasts.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates a flow chart of a method for automated injection of Java bytecode instructions for Java load time optimization via runtime checking with upcasts in accordance with exemplary embodiments.

Figure 1:
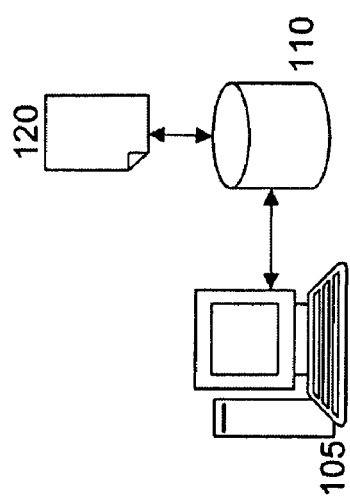
FIG. 1 illustrates an exemplary system for automated injection of Java bytecode instructions for Java load time optimization via runtime checking with upcasts.

The detailed description explains the preferred embodiments of the invention, together with advantages and features, by way of example with reference to the drawings.

DETAILED DESCRIPTION OF THE INVENTION

In exemplary embodiments, the systems and methods described herein provide a tool that statically analyzes the Java bytecode, looking for specific patterns of instructions, such as those performing verification of every exception being thrown and caught as well as situations with upcasting.

Once a pattern is detected, the bytecode can be altered such that Java virtual machine verifies the code without loading any extra classes at verification time. If the code is executed at runtime, then the class is loaded and verification is performed at run time. This code has the same behavior as before the tool was applied. The difference between the code before the tool is applied and after the tool is applied is that should there be a real verification error, it is not detected unless and until the referencing code is executed (e.g., the exception thrown is found to not be a subclass of java.lang.Throwable). In exemplary embodiments, the systems and methods described herein also report differently in the failure case in that it is result in possibly a different type of Error or Exception instead of a VerifyError. These bytecode modifications also cause a negligible increase in the size of the modified class files. Furthermore, there are many classes that are being loaded due to verification, which may never be used, which cause increased start-up time and increased memory footprint. Parts of the Java application, such as exceptions, are used mostly during an error in the application, which does not happen often. In addition, these optimizations can be performed once on a compiled application (i.e., the .class files) and does not need to be re-applied unless the application is recompiled. The exemplary embodiment of the optimizations is also fully automated thereby benefiting inexperienced users. It can be used by both developers and end users to achieve the same improvements. In exemplary embodiment, the optimization does not require access to an applications Java source code.

Turning now to the drawings in greater detail, it will be seen that in FIG. 1 there is FIG. 1 illustrates an exemplary system 100 for automated injection of Java bytecode instructions for Java load time optimization via runtime checking with upcasts. In exemplary embodiments, the system 100 includes a processing device 105 such as a computer, which includes a storage medium or memory 110. The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processing device 105. The system 100 can further include a Java virtual machine 120 residing in the memory.

In exemplary embodiment, six patterns have been identified that share the problem of performing verification of every exception being thrown and caught as well as situations with upcasting: Java exception throws; Java exception catches; upcasts of method arguments; upcasts of method returns; upcasts of field access; and mismatches after data flow merge points. In exemplary embodiments, the systems and method described herein statically scan Java classes to locate class file configurations and bytecode patterns that cause loading of additional classes to complete verification of the class. In addition, the systems and method described herein rewrite the bytecodes to delay the loading of the additional classes until required at runtime, or possibly not at all. In exemplary embodiments, the systems and methods described herein look for the above-mentioned patterns as now described.

FIG. 2 illustrates a flow chart of a method for automated injection of Java bytecode instructions for Java load time optimization via runtime checking with upcasts in accordance with exemplary embodiments. It is appreciated that the term "stack" is used in this case to refer to the execution state represented by the Data Stack and the Local Variable array in combination. At step 205, the method 200 generates a stack and local variable state for each of a number of bytecodes. At step 210, a subclass configured to keep a history of instructions that have modified the stack is generated. At step 215, the method 200 statically scans Java classes associated with the bytecodes to locate class file configurations and bytecode patterns that cause loading of additional classes to complete a verification of each of the classes in the Java classes, the bytecode patterns including a Java exception throw, a Java exception catch, an upcast of method arguments, an upcast of method returns, an upcast of field access and an upcast of a type merge. At step 220, the bytecodes are rewritten to delay the loading of the additional classes until required at a runtime. At step 225, the modifications that have been made to the stack by the instructions are recoded. At step 230, the modifications are applied to each of the bytecodes.

With regard to the Java exception throws, the systems and methods described herein look for "athrow" bytecodes that throw something besides java.lang.Throwable. Once found, this class is optionally verified as a subclass of a java.lang.Throwable and a "checkcast" instruction with parameter of java.lang.Throwable is inserted before the throw instruction. This "checkcast" can be inserted anywhere between the creation of the exception object and the "athrow" bytecode as long as the exception object is on the top of the stack at the insertion point. The simplest implementation is to insert the "checkcast" bytecode immediately prior to the "athrow" bytecode.

With regard to the Java exception catches, the systems and methods described herein look for catch clauses in the Code attribute of the method_info array of the Java .class files instructions and modifies the parameter to catch a java.lang.Throwable. The body of the catch block is wrapped in a conditional block whose condition is a result of an "instanceof" bytecode with the argument being the caught item and the parameter being the type of class that was caught by the catch block before it is modified. Other catch blocks belonging to the same try/catch statement are also put inside the java.lang.Throwable catch block wrapped by their own respective conditional blocks. Exceptions that do not match the "instanceof" exception type are re-thrown to be correctly propagated up the Java call stack.

With regard to upcasts of method arguments, the systems and methods described herein trace through the method's body keeping track of the stack and local variables at each bytecode. If a method call that takes in arguments is identified, then the type of arguments the method expects and the type of the items on the stack are known. If the item on the stack is a subclass of the item that the method argument requires, then a "checkcast" bytecode with the parameter of the method argument is inserted at the point in the bytecode where this argument was on the top of the stack, which requires a history of where each stack item was placed on stack and whether items have been generated via special cases such as "dup" and it's family of related bytecodes or merges of multiple data flow paths. In case of "dup" and the family of related bytecodes, extra instructions can be inserted to re-arrange the item that we need to be on top of the stack, place a checkcast, and then re-arrange it back to the original position. In case of a merge, all of the paths that lead to the merge can be tracked and a duplicate "checkcast" bytecode can be placed in each path.

With regard to upcasts of method returns, the systems and methods described herein can look at every method that returns a reference value. Similarly to upcasts of method arguments described above, the systems and methods described herein trace through the method's body keeping track of the stack and local variables. If one of the return family of bytecodes is identified, the systems and methods described herein check the top of stack against the return type for the method. If the top item on the stack is a subclass of the return type, then a checkcast instruction is placed before the return instruction with parameter of the method's return type.

With regard to upcasts of field access, similarly to upcasts of method arguments and upcasts of method returns, the systems and methods described herein keep track of the stack and local variable to check the type of variable against the type expected for "putfield" and "putstatic" bytecodes (writes to fields). In the case of placing a subclass of an item to the field with known type, then a "checkcast" bytecode with parameter of the field's type can be placed in the instruction stream prior to the "putfield" or "putstatic" bytecode.

With regard to upcasts of a type merge, similarly to upcasts of method arguments and upcasts of method returns, the systems and methods described herein keep track of the stack and local variable types on each execution path to determine the requirement for merging. In the case of a merge, a "checkcast" bytecode with parameter of the field's type can be placed in either of both of the instruction streams prior to the merge point (e.g., if one stream contains an instance of class Dog and the other contains an instance of type Cat, then each would receive a "checkcast" bytecode with a parameter of Mammal. If one stream contains an instance of class Dog and the other contains an instance of class Mammal, then only the stream containing class Dog would receive the "checkcast" bytecode with the parameter Mammal). The merge is always possible for any collection of classes as java.lang.Object is the common superclass for all classes In exemplary embodiments, the systems and methods create a JAPT extension. JAPT is a framework that parses bytecodes and can recreate the class files. JAPT also has a number of existing extensions to manipulate bytecodes and generate stack and local variable data by symbolic dataflow execution. In exemplary embodiments, the BT_StackShapeVisitor class from JikesBT is implemented to create a subclass that keeps track of history of which instructions have modified the stack as the systems and methods trace through the bytecode. By having stack at each bytecode and the history of which instruction has modified which items on the stack, the systems and methods can proceed to track through the bytecode. We go in no particular order looking for patterns described above. All new modifications are recorded in an array. When tracing completes we apply all the modifications. By performing the modifications at the end, the stack history does not have to be recreated, which would be invalid once we start inserting instructions in no particular order.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a Java virtual machine system, a method for automated injection of Java bytecode instructions for Java load time optimization via runtime checking with upcasts, the method consisting of:
   in a processor couple to a memory having a process in the Java virtual machine system, the process configured for:
   generating an execution state for the Java bytecode instructions;
   generating a subclass configured to keep a history of the Java bytecode instructions that have modified the execution state;
   statically scanning a plurality of Java classes associated with the Java bytecode instructions to locate class file configurations and Java bytecode instruction patterns that cause loading of additional classes to complete a verification of each of the classes in the plurality of Java classes, the Java bytecode instruction patterns including a Java exception throw, a Java exception catch, an upcast of method arguments, an upcast of method returns, an upcast of field access and a dataflow merge of different classes;
   delaying the loading of the additional classes until required at a runtime;
   recording modifications that have been made to the execution state by the Java bytecode instructions; and
   applying the modifications to each of the bytecodes in the Java bytecode instructions.

2. A Java virtual machine system configured to automatically inject Java bytecode instructions for Java load time optimization via runtime checking with upcasts, the system consisting of:
   a computer processor coupled to a memory having instructions for:
   generating an execution state for the Java bytecode instructions;
   generating a subclass configured to keep a history of the Java bytecode instructions that have modified the execution state;

statically scanning a plurality of Java classes associated with the Java bytecode instructions to locate class file configurations and Java bytecode instruction patterns that cause loading of additional classes to complete a verification of each of the classes in the plurality of Java classes, the Java bytecode instruction patterns including a Java exception throw, a Java exception catch, an upcast of method arguments, an upcast of method returns, an upcast of field access and a dataflow merge of different classes;

delaying the loading of the additional classes until required at a runtime;

recording modifications that have been made to the execution state by the Java bytecode instructions; and applying the modifications to each of the bytecodes in the Java bytecode instructions.

* * * * *